Jan. 14, 1969   KARL-HEINZ MEINIG   3,422,268
RADIATION DETECTING DEVICE
Filed Dec. 29, 1965   Sheet 1 of 3
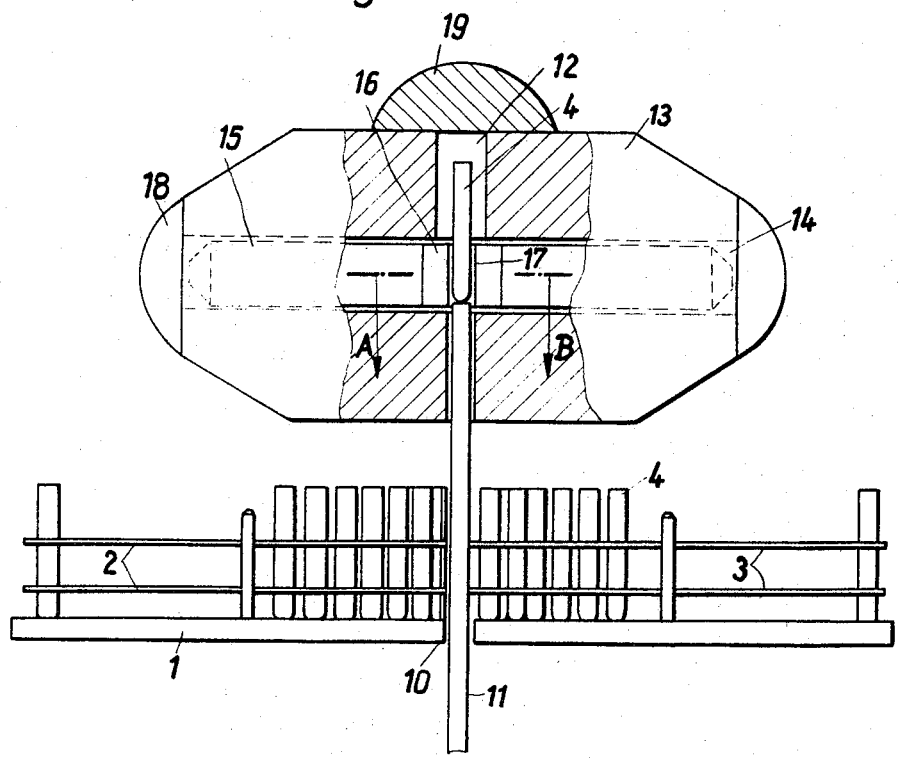
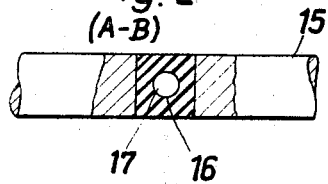
Inventor:
Karl-Heinz Meinig
By
Watson, Cole, Grindle & Watson
Attys.

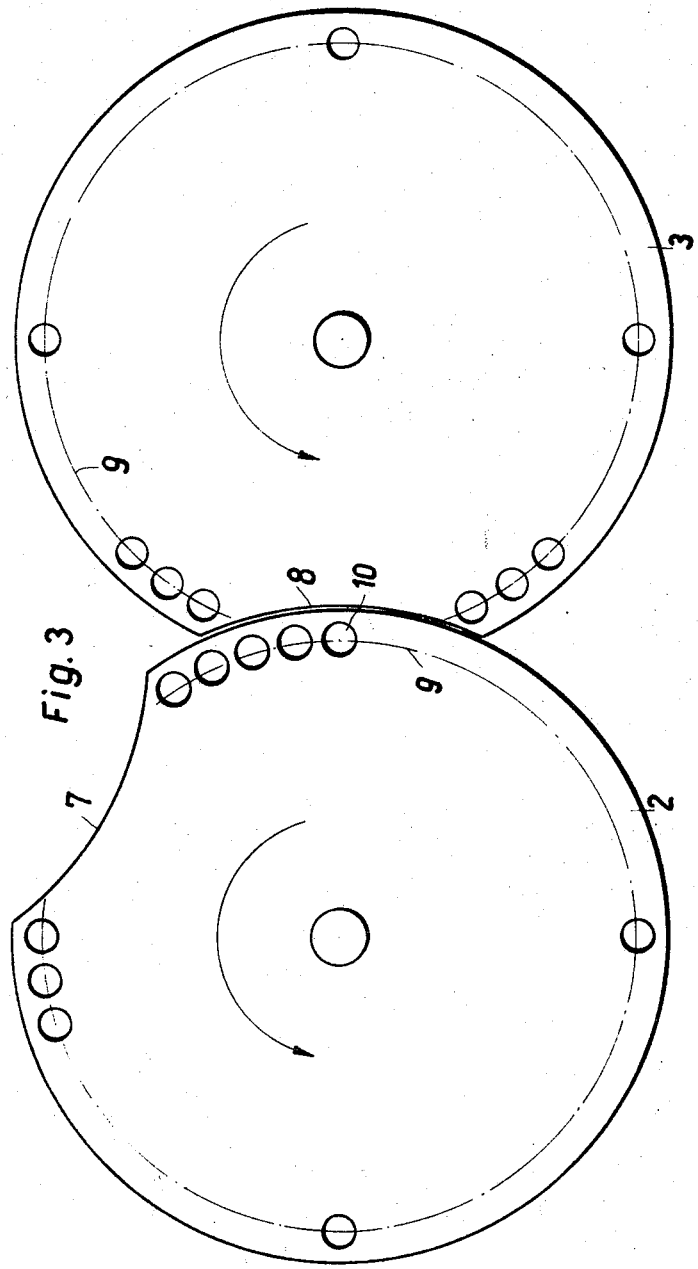

United States Patent Office
3,422,268
Patented Jan. 14, 1969

3,422,268
RADIATION DETECTING DEVICE
Karl-Heinz Meinig, 25 Graunstrasse,
Berlin, 65, Germany
Filed Dec. 29, 1965, Ser. No. 517,344
Claims priority, application Germany, Jan. 5, 1965,
M 63,692
U.S. Cl. 250—106          8 Claims
Int. Cl. G21h 5/00

ABSTRACT OF THE DISCLOSURE

A sample handling and radiation detecting device having horizontally moving sample cassette with vertical holes for receiving samples together with a sample transporter and means for guiding movement of the cassette to move the samples to a radiation detector having a crystal forming a part thereof.

---

The invention relates to automatic sample handling devices and more particularly to sample handling devices for presenting samples in a group of samples sequentially for testing the radio activity of the samples.

A preferred embodiment of the invention includes means for measuring both gamma and beta radiation.

The measurement of the gamma radiation of radio active samples is usually carried out with a detector which consists of a scintillator crystal with a hole therein to receive the sample. The detector further comprises a multiplier for the secondary electrons and a pre-amplifier which is connected to a pulse circuit. In order to protect it from radiation from the environment (cosmic radiation and natural radiation of nearby materials) the detector is housed in a shield. The samples are carried in test tubes and in order to avoid the necessity of placing the test tubes one by one by hand in the crystal, in recent years sample handling devices for fifty, a hundred and more samples have been constructed. In these devices two different transport mechanisms for picking up the samples and placing them in their test tubes in the hole in the crystal, a sample transporter, such as a pair of tongs or a magnetic device is used. Another part of the mechanism is a moveable carrier for the samples, from which the transporter carries the test tube samples sequentially upwards to the detector which can be placed centrally over the carrier or to the side thereof. The samples then have to be lowered into the hole in the crystal. After the measurement has been completed the transporter moves back along the same path to place the sample concerned on the carrier. The carrier is then moved so as to bring the next sample into a position where the transporter can engage it and move it to the detector. In one such known device the carrier is in the form of a rotating circular plate with peripheral holes for the test tubes containing the samples. After a sample has been examined the carrier is rotated so as to bring the next sample into a suitable position for engagement by the transporter.

The various types of sample handling devices of this type which are known have various disadvantages. In the first place a transporter is necessary which has to carry out movements in various directions and therefore, as is well known, must be of complicated construction. A further disadvantage is that the known sample handling devices take up a considerable amount of space since the individual test tubes have to be carried on the transporter to above the crystal before they can be lowered into the hole therein. Also standard test tubes have to be used so that a user, once having procured a sample handling device, remains tied to the original supplier for replacement sample tubes.

Yet a further disadvantage of known sampling devices which has been found to occur in practice is that, in the case of those devices using tongs or other mechanical test tube gripping devices, there is a danger of breakage of the tubes with the result that the entire apparatus becomes contaminated so that work must be interrupted and the device thoroughly cleaned before it can be placed into operation again. A further substantial disadvantage with the known devices is that they are all designed to lower the samples sequentially into the detector with the result that the detector must be open in an upward direction and is affected by radiation from the environment.

One object of my present invention is to avoid the disadvantages of known devices which have just been referred to.

Accordingly the present invention consists in a sample handling and radiation detecting device, comprising a horizontal and horizontally moving sample cassette having vertical holes for receiving samples, a vertically acting sample transporter, means for guiding movement of the cassette for bringing the sample holes successively into vertical alignment with the sample transporter, a radiation detector, a crystal which makes up part of the radiation detector and has a hole aligned vertically with the transporter, and a lead shield around the detector.

Preferably the transporter consists simply of a vertically moving pin arranged so as to lift the samples one by one out of the holes of the cassette into the hole in the crystal of the detector. Since only a lifting action is carried out, the diameter of the sample test tubes and the size of their top flanges are not by any means critical so that a large range of test tubes can be used in the sample handling device. The maximum diameter of the test tubes is only determined by the bore of the hole in the crystal while the maximum height of the test tubes is determined by the height of the cavity in the lead shield containing the detector. Moreover it is found that if the hole in the crystal passes right through the crystal, large volumes of samples can be examined. With the device in accordance with the invention the samples can be protected from substantially all radiation from the environment since only a downwardly directed hole in the lead shield is required. The transporter can move the samples up into the shield one by one into the hole in the crystal. Also, during measurement the hole in the shield is practically completely blocked by the transporter.

In accordance with a preferred feature of the invention, the cassette has sample receiving holes in parallel rows and means are provided for guiding the cassette in a direction parallel to these rows and in a further direction perpendicular thereto. This type of cassette, which is extremely compact, can be made in one or more sections and is moved first in a direction parallel to one row of samples and then in the opposite direction for the next row of samples.

Preferably, in this form of the invention, the cassette is carried on a first pair of parallel bars for guiding movement of the cassette in one direction and on a further pair of bars perpendicular to the first pair for moving the cassette in the further direction.

The bars can make up sides of superposed frames carried on a table, one frame extending along the table and having half the width of the table while the other frame extends across the table and has a breadth equal to half the length of the table. In operation one frame is moved across the table while the other is moved along the table.

In a further embodiment of the invention there is employed two circular cassettes able to rotate about vertical axes, the sums of the radii of the cassettes being more than the distance between the axes, the transporting device being placed between the axes, and each cassette having at least one segment-shaped recess into which the periphery of the other cassette can fit so that it can rotate.

Embodiments of the invention will now be described with reference to the attached drawings, in which:

FIG. 1 is a side view partly in section of a first embodiment of the invention.

FIG. 2 is a section on the line A–B of FIG. 1 in the direction of the arrows.

FIG. 3 is a plan view showing the two cassettes of the first embodiment in plan.

Figure 4:
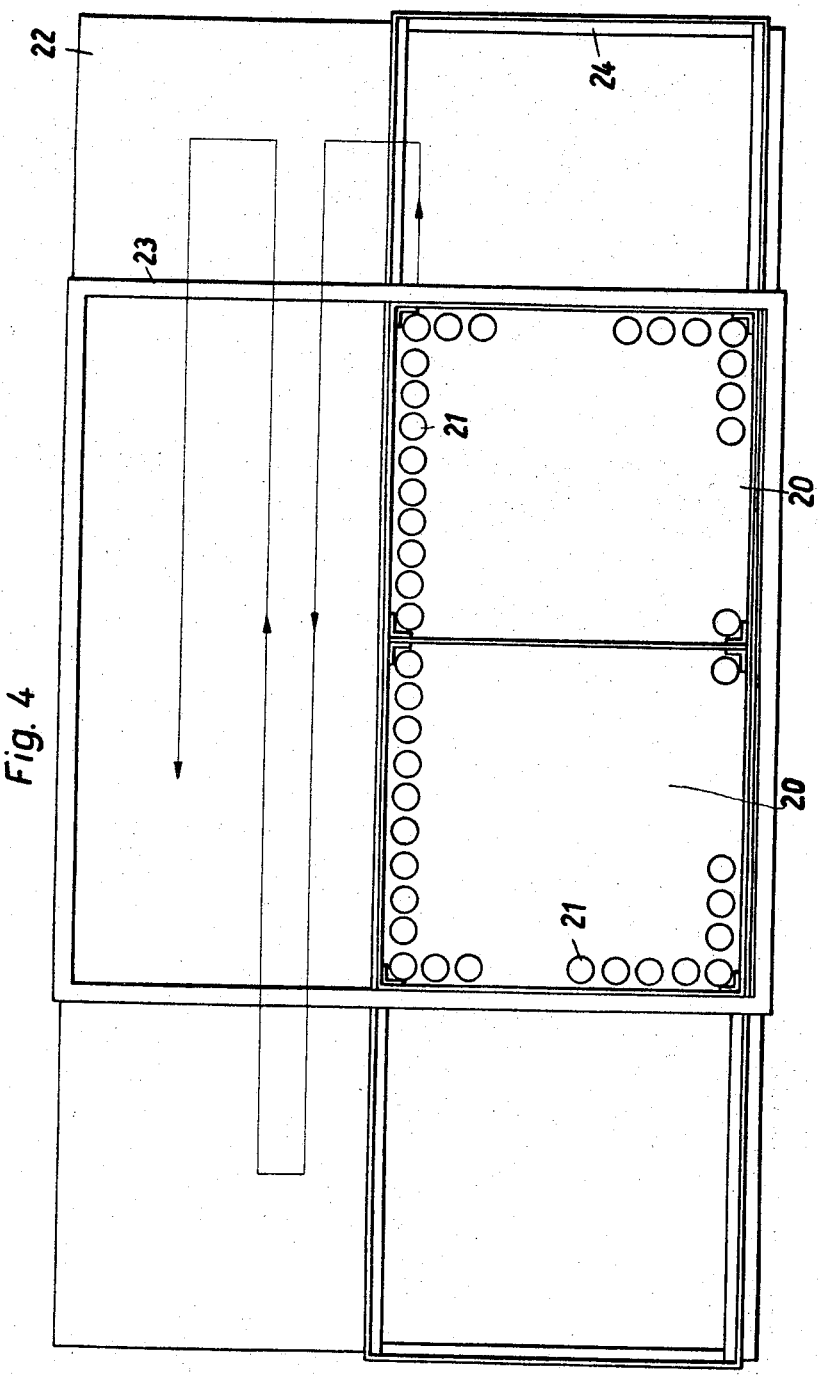
FIG. 4 shows a further embodiment of the invention.

Referring more particularly to FIG. 1, the sample handling device comprises a stationary base plate 1 with two cassettes or carriers thereabove of which one consists of two parallel plates 2 and the other consists of two parallel plates 3. As shown in FIG. 3 samples in test tubes 4 are placed in vertical holes 5 in the cassette 2 and vertical holes 6 in the cassette 3. The holes extend around the peripheries of the two cassettes 2 and 3 except for segment-shaped recesses 7 and 8 respectively. These recesses 7 and 8 are necessary since the vertical axes of rotation of the two cassettes are spaced at a distance which is less than the sum of the radii of the two cassettes. Therefore, in order for cassette 2 to rotate, the segment 8 in the cassette 3 must be brought into the position shown in FIG. 3 so that the periphery of the cassette 2 can fit into the recess and the cassette can rotate. Reference numeral 9 indicates imaginary circles drawn through the centres of the holes 5 and 6 and it will be noted that these circles touch at a point between the axes of rotation. With the cassettes in the position in FIG. 3, a hole, in the cassette 2 is over the vertically acting transporter 11 (see FIG. 1). In order to place a sample in the scintillation crystal 16, the transporter 11, which can be in the form of a simple pin, is moved from a position in which the top thereof is flush with the top surface of the table 1 up through the hole 10 in the table to move the sample over the hole 10 up through a hole in the bottom of a lead shield 13 around the scintillation crystal 16 of a detector contained in the shield. FIG. 1 shows a sample tube 4 raised into its position in the scintillation crystal. When the measurement has been carried out by the detector, the transporter 11 is moved down again with the tube thereon. When the transporter has reached the bottom of its stroke, that is so that its top is flush with the top of the table 1, the cassette 2 is rotated so as to bring a further test tube with a sample therein over the top of the transporter and the operation is then repeated. When all the test tubes in the cassette 2 have been examined in sequence, the segment-shaped recess 7 in the periphery of the cassette 2 will be in such a position that the cassette 3 can now rotate for the sequential examination of the samples carried therein.

From FIG. 1 it will be seen that the shield 13 of the detector has a transverse hole 14 containing one or more multipliers 15. The crystal 16 has its hole 17 aligned with the hole 10 and the line of action of the transporter. The transverse hole 14 is covered at its two ends by lead caps 18. As shown in FIG. 2, the crystal can consist of one piece or of two pieces each provided half way round the hole. The hole 12 in the top part of the lead shield is covered by a lead cap 19. The transporter 11 is preferably made of radiation shielding material so that at the moment when measurement is carried out by means of the detector, the crystal is completely shielded on all sides, that is to say by the shield 13, the cap 19, and the transporter 11.

The only difference between the embodiment of the invention shown in FIG. 4 from the embodiment just described, lies in the different form of the cassette which in this case is rectangular and is made in two sections. The cassette has parallel rows of holes 21 for receiving sample tubes. The cassette is supported on a table or frame 22 by means of a sliding frame 23 which extends across the table 22 but has a breadth equal to only half the length of the table and below this frame 23 there is a further frame 24 which extends along the entire length of the table 22 but has a width only equal to half the width of the table. The frames are guided so that the frame 24 can move across the table while the frame 23 can move along the table 22. In this manner it is possible to cause the cassette to move first in a direction along one row of holes therein and then in the opposite direction along the next row of holes so that the samples are brought sequentially over the hole 10 of the transporter 11 and therefore under the hole 17 in the crystal 16.

Modifications can be made in the sample handling apparatus described. For instance it is not necessary that a radiation detector should form part thereof and it can be applied for other uses in which the sequential withdrawal and replacement of samples from a group of samples is required. Moreover the invention can be applied to cases in which test tubes have to be moved under a device for filling with liquid one by one without the sample tubes being withdrawn from the cassette or cassettes.

While I have described two specific embodiments of my invention it is to be understood that I have only done this in order that my invention may be placed into effect more readily, and the scope of the monopoly I seek is to be determined by the spirit and gist of the following claims.

What I claim is:

1. Automatic exchanger for the measurement of concentration of activity of liquid radioactive samples contained preferably in test tubes, in which a movable carrier containing a multiplicity of samples and from which said samples are taken individually and one after the other by means of a transport element, a scintillation crystal into the bores of which the tubes are introduced for the purpose of measurement and are returned to the carrier after completion of measurement, the liquid sample being introduced into a continuous bore hole of the scintillation crystal in alignment in the direction of movement of the transport element and a bolt-like transport element shiftable perpendicularly for the test tubes.

2. Automatic exchanger according to claim 1 in which the movable carrier receiving the liquid samples consists of a box arrangement provided with bore holes arranged in rows, and is guided shiftably in meandering fashion on a fixed table to bring each individual sample one after the other in alignment into the path of movement of the transport element.

3. Automatic exchanger according to claim 1 in which the movable carrier receiving the liquid samples consists of a box arrangement provided with bore holes arranged in rows, and is guided shiftably in meandering fashion on a fixed table to bring each individual sample one after the other in alignment into the path of movement of the transport element, the table being in the form of a guide frame along longitudinal and traverse sides of which guide sleds are provided, arranged shiftably and independently of one another and the box arrangement penetrating slidably through the guide sleds arranged one on top of the other and corresponding in their dimension to approximately half the length and half the width of the guide frame and guided inside the area of the guide sleds which overlap each other.

4. Automatic exchanger according to claim 1, in which the movable carrier consists of two pairs of rotation plates arranged one beside the other into the periphery of which bores are provided of which is adapted to receive a series of liquid samples, every pair of plates having a circular recess which makes it possible as to engagement of the alternatingly rotating pairs of plates and in that below the particular sample which lies at any particular time in the middle between the pivotal points of both pairs of plates on the line connecting the pivotal points, the transport element being arranged.

5. Automatic exchanger according to claim 1, in which the bolt-like transport element consisting of material that shields against radiation and can be guided through a bore made in the middle of the surface of the table and in its rest position being about flush with its surface with the surface of the table.

6. Automatic exchanger according to claim 1, in which the bore hole passes through the scintillation crystal and runs perpendicularly in relation to the longitudinal axis of a cylindrical detector arrangement consisting of the scintillation crystal and the secondary electron multiplier with preamplifier.

7. Automatic exchanger according to claim 1, in which the penetrating bore hole of the scintillation crystal is formed through the combination of two scintillation crystals provided with half holes.

8. Automatic exchanger according to claim 1, in which the detecting arrangement lying within a cross bore is encompassed in itself by a lead shield which has a perpendicular guide channel lying in the path of movement of the transport element aligned with the bore hole.

References Cited

UNITED STATES PATENTS 3,221,781  12/1965  Forsstrom _____ 141—130
3,270,202  8/1966   Long et al. _____ 250—106

RALPH G. NILSON, *Primary Examiner.*

M. J. FROME, *Assistant Examiner.*